United States Patent
Nachenberg

(10) Patent No.: US 8,510,836 B1
(45) Date of Patent: Aug. 13, 2013

(54) LINEAGE-BASED REPUTATION SYSTEM

(75) Inventor: Carey S. Nachenberg, Northridge, CA (US)

(73) Assignee: Symantec Corporation, Mountain View, CA (US)

( * ) Notice: Subject to any disclaimer, the term of this patent is extended or adjusted under 35 U.S.C. 154(b) by 359 days.

(21) Appl. No.: 12/831,004

(22) Filed: Jul. 6, 2010

(51) Int. Cl.
| | |
|---|---|
| G06F 21/00 | (2006.01) |
| G06F 17/00 | (2006.01) |
| G06F 12/14 | (2006.01) |
| G06F 11/00 | (2006.01) |
| G06F 15/18 | (2006.01) |
| G06F 15/16 | (2006.01) |
| G06Q 30/00 | (2012.01) |
| H04L 12/58 | (2006.01) |
| H04L 29/06 | (2006.01) |
| G06F 7/00 | (2006.01) |
| G06F 17/30 | (2006.01) |

(52) U.S. Cl.
USPC ............ 726/23; 726/22; 726/24; 726/25; 726/27; 709/203; 709/223; 706/12

(58) Field of Classification Search
USPC ............ 726/23, 22, 24, 25, 27; 709/203, 709/223; 706/12
See application file for complete search history.

(56) References Cited

U.S. PATENT DOCUMENTS

| | | | |
|---|---|---|---|
| 7,197,539 B1 | 3/2007 | Cooley | |
| 7,412,516 B1 | 8/2008 | Brown et al. | |
| 7,472,420 B1 * | 12/2008 | Pavlyushchik | 726/24 |
| 7,546,349 B1 | 6/2009 | Cooley | |
| 7,562,304 B2 | 7/2009 | Dixon et al. | |
| 7,587,367 B2 | 9/2009 | Mengerink | |
| 7,668,951 B2 | 2/2010 | Lund et al. | |
| 7,783,741 B2 | 8/2010 | Hardt | |
| 7,870,608 B2 | 1/2011 | Shraim et al. | |
| 8,001,606 B1 * | 8/2011 | Spertus | 726/25 |

(Continued)

FOREIGN PATENT DOCUMENTS

WO    WO 2009076555 A2 *    6/2009

OTHER PUBLICATIONS

Yinglian Xie, Fang Yu, Qifa Ke, Martin Abadi, Eliot Gillum, Krish Vitaldevaria, Jason Walter, Junxian Huang, Zhuoqing Morley Mao; "Innocent by association: early recognition of legitimate users"; Oct. 2012; CCS '12: Proceedings of the 2012 ACM conference on Computer and communications security; pp. 353-364.*

(Continued)

*Primary Examiner* — Andrew L. Nalven
*Assistant Examiner* — Courtney Fields
(74) *Attorney, Agent, or Firm* — Fenwick & West LLP

(57) ABSTRACT

A computer generates a reputation score for a file based at least in part on the lineage of the file. A security module on a client monitors file creations on the client and identifies a parent file creating a child file. The security module provides a lineage report describing the lineage relationship to a security server. The security server uses lineage reports from the client to generate one or more lineage scores for the files identified by the reports. The security server aggregates the lineage scores for files reported by multiple clients. The aggregated lineage scores are used by the security server to generate reputation scores for files. The reputation score for a file indicates a likelihood that the file is malicious. The security server reports the reputation scores to the clients, and the clients use the reputation scores to determine whether files detected at the clients are malicious.

19 Claims, 5 Drawing Sheets

(56) References Cited

U.S. PATENT DOCUMENTS

| | | | |
|---|---|---|---|
| 8,019,689 B1 | 9/2011 | Nachenberg | |
| 8,200,587 B2 | 6/2012 | Deyo | |
| 8,250,657 B1 | 8/2012 | Nachenberg et al. | |
| 8,312,536 B2 | 11/2012 | Nachenberg et al. | |
| 8,341,745 B1 | 12/2012 | Chau et al. | |
| 2002/0046041 A1 | 4/2002 | Lang | |
| 2003/0167308 A1 | 9/2003 | Schran | |
| 2004/0054661 A1 | 3/2004 | Cheung | |
| 2005/0050335 A1 | 3/2005 | Liang et al. | |
| 2005/0268090 A1 | 12/2005 | Saw et al. | |
| 2005/0283837 A1 | 12/2005 | Olivier et al. | |
| 2006/0026123 A1 | 2/2006 | Moore et al. | |
| 2006/0085328 A1 | 4/2006 | Cohen et al. | |
| 2006/0212270 A1 | 9/2006 | Shiu et al. | |
| 2006/0212925 A1 | 9/2006 | Shull et al. | |
| 2006/0212930 A1 | 9/2006 | Shull et al. | |
| 2006/0212931 A1 | 9/2006 | Shull et al. | |
| 2006/0230039 A1 | 10/2006 | Shull et al. | |
| 2006/0253458 A1 | 11/2006 | Dixon et al. | |
| 2006/0253581 A1 | 11/2006 | Dixon et al. | |
| 2006/0253583 A1 | 11/2006 | Dixon et al. | |
| 2006/0253584 A1 | 11/2006 | Dixon et al. | |
| 2007/0011739 A1 | 1/2007 | Zamir et al. | |
| 2007/0016953 A1* | 1/2007 | Morris et al. | 726/24 |
| 2007/0050444 A1 | 3/2007 | Costea et al. | |
| 2007/0067843 A1* | 3/2007 | Williamson et al. | 726/24 |
| 2007/0094734 A1* | 4/2007 | Mangione-Smith et al. | 726/24 |
| 2007/0107053 A1 | 5/2007 | Shraim et al. | |
| 2007/0124579 A1 | 5/2007 | Haller | |
| 2007/0143629 A1 | 6/2007 | Hardjono et al. | |
| 2007/0156886 A1 | 7/2007 | Srivastava | |
| 2007/0162349 A1 | 7/2007 | Silver | |
| 2007/0192855 A1 | 8/2007 | Hulten et al. | |
| 2007/0233782 A1 | 10/2007 | Tali | |
| 2008/0005223 A1 | 1/2008 | Flake et al. | |
| 2008/0028463 A1 | 1/2008 | Dagon et al. | |
| 2008/0077994 A1* | 3/2008 | Comlekoglu | 726/27 |
| 2008/0082628 A1 | 4/2008 | Rowston et al. | |
| 2008/0082662 A1 | 4/2008 | Dandliker et al. | |
| 2008/0104180 A1 | 5/2008 | Gabe | |
| 2008/0109244 A1 | 5/2008 | Gupta | |
| 2008/0109473 A1 | 5/2008 | Dixon et al. | |
| 2008/0109491 A1 | 5/2008 | Gupta | |
| 2008/0114709 A1 | 5/2008 | Dixon et al. | |
| 2008/0133540 A1 | 6/2008 | Hubbard et al. | |
| 2008/0133972 A1 | 6/2008 | Verbowski et al. | |
| 2008/0137864 A1 | 6/2008 | Jin et al. | |
| 2008/0140442 A1 | 6/2008 | Warner | |
| 2008/0140820 A1 | 6/2008 | Snyder et al. | |
| 2008/0141366 A1 | 6/2008 | Cross et al. | |
| 2008/0189788 A1 | 8/2008 | Bahl | |
| 2008/0255977 A1 | 10/2008 | Altberg et al. | |
| 2008/0263677 A1 | 10/2008 | Kaditz et al. | |
| 2009/0125382 A1 | 5/2009 | Delepet | |
| 2009/0254993 A1 | 10/2009 | Leone | |
| 2009/0282476 A1 | 11/2009 | Nachenberg et al. | |
| 2009/0328209 A1 | 12/2009 | Nachenberg | |
| 2010/0005291 A1 | 1/2010 | Hulten et al. | |
| 2010/0153354 A1 | 6/2010 | Buccella et al. | |
| 2011/0040825 A1* | 2/2011 | Ramzan et al. | 709/203 |
| 2011/0055923 A1* | 3/2011 | Thomas | 726/23 |
| 2011/0067101 A1* | 3/2011 | Seshadri et al. | 726/22 |
| 2011/0225655 A1* | 9/2011 | Niemela et al. | 726/24 |
| 2012/0278264 A1* | 11/2012 | Deyo | 706/12 |

OTHER PUBLICATIONS

International Search Report and Written Opinion, PCT Application No. PCT/US09/48328, Dec. 22, 2010, 8 pages.

Brin, S. et al., "The Anatomy of a Large-Scale Hypertextual Web Search Engine," Computer Networks and ISDN Systems, 1998, pp. 107-117, vol. 30, No. 1-7.

Christodorescu, M. et al., "Semantics-Aware Malware Detection," In Proceedings of the 205 IEEE Symposium on Security and Privacy, IEEE Computer Society, 2005.

Gonzalez, J. et al., "Residual Splash for Optimally Parallelizing Belief Propagation," AISTATS, 2009, 8 pages.

Gyongyi, Z. et al., "Combating Web Spam with Trustrank," Proceedings of the Thirtieth International Conference on Very Large Data Bases, VLDB Endowment, 2004, pp. 576-587, vol. 30.

Idika, N. et al., "A Survey of Malware Detection Techniques," Technical Report, Department of Computer Science, Purdue University, 2007, 48 pages.

Kephart, J. et al., "Automatic Extraction of Computer Virus Signatures," 4th Virus Bulletin International Conference, 1994, pp. 178-184.

Kleinberg, J., "Authoritative Sources in a Hyperlinked Environment," Journal of the ACM (JACM), 1999, pp. 604-632, vol. 46, No. 5.

Kolter, J. et al., "Learning to Detect and Classify Malicious Executables in the Wild," The Journal of Machine Learning Research, 2006, p. 2721-2744, vol. 7.

McGlohon, M. et al., "SNARE: A Link Analytic System for Graph Labeling and Risk Detection," Proceedings of the 15th ACM SIGKDD International Conference on Knowledge Discovery and Data mining, ACM, 2009, pp. 1265-1274, New York, N.Y.

Neville, J. et al., "Using Relational Knowledge Discovery to Prevent Securities Fraud," Proceedings of the Eleventh ACM SIGKDD International Conference on Knowledge Discovery in Data Mining, ACM, 2005, p. 458.

Neville, J. et al., "Collective Classification with Relational Dependency Networks," Workshop on Multi-Relational Data Mining (MRDM-2003), 2003.

Pandit, S. et al., "NetProbe: A Fast and Scalable System for Fraud Detection in Online Auction Networks," WWW '07, Proceedings of the 16th International Conference on World Wide Web, ACM, 2007, pp. 201-210, New York, N.Y.

Pei, J. et al., "On Mining Cross-Graph Quasi-Cliques," Proceedings of the Eleventh ACM SIGKDD International Conference on Knowledge Discovery in Data Mining, ACM, 2005, 11 pages.

Schultz, M. et al., "Data Mining Methods for Detection of New Malicious Executables," IEEE Symposium on Security and Privacy, IEEE Computer Society, 2001, pp. 38-49.

Siddiqui, M. et al., "A Survey of Data Mining Techniques for Malware Detection Using File Features," ACM-SE 46: Proceedings of the 46th Annual Southeast Regional Conference on XX, ACM, 2008, pp. 509-510, New York, N.Y.

Symantec Internet Security Threat Report, 36 pages, [Online] [Retrieved on Aug. 8, 2010] Retrieved from the Internet<URL:http://eval.symantec.com/mktginfo/enterprise/white_papers/b-whitepaper_exec_summary_internet_security_threat_report_xiii_04_2008.en-us.pdf>.

Symantec Malware Definition, [Online] [Retrieved on Aug. 6, 2010] Retrieved from the Internet<URL:http://www.symantec.com/norton/security_response/malware.jsp>.

Symantec Norton Community Watch Privacy Policy, [Online] [Retrieved on Aug. 6, 2010] Retrieved from the Internet<URL:http://www.symantec.com/about/profile/policies/ncwprivacy.jsp>.

Symantec Unveils New Model of Consumer Protection Codenamed "Quorum", 3 pages, [Online] [Retrieved on Aug. 8, 2010] Retrieved from the Internet<URL:https://www.symantec.com/about/news/release/article.jsp?prid=20090706_02>.

Tesauro, G. et al., "Neural Networks for Computer Virus Recognition," IEEE Expert, 1996, pp. 5-6, vol. 11, No. 4.

Tong, H. et al., "Fast Best-Effort Pattern Matching in Large Attributed Graphs," Proceedings of the 13th ACM SIGKDD International Conference on Knowledge Discovery and Data Mining, ACM, 2007, 10 pages.

Wang, W. et al., "GraphMiner: A Structural Pattern-Mining System for Large Disk-Based Graph Databases and Its Applications," Proceedings of the 2005 ACM SIGMOD International Conference on Management of Data, ACM, 2005, pp. 879-881.

Weaver, N. et al., "A Taxonomy of Computer Worms," Proceedings of the 2003 ACM Workshop on Rapid Malcode, ACM, 2003, pp. 11-18, New York, N.Y.

Yan, X. et al., "gSpan: Graph-Based Substructure Pattern Mining," Proceedings of the 2002 IEEE International Conference on Data Mining (ICDM '02), 2002, 4 pages.

Yan, X. et al., "Mining Closed Relational Graphs with Connectivity Constraints," Proceedings of the Eleventh ACM SIGKDD International Conference on Knowledge Discovery in Data Mining, ACM, 2005, p. 333.

Yedidia, J. et al., "Understanding Belief Propagation and Its Generalizations," Exploring Artificial Intelligence in the New Millennium, 2003, pp. 236-239, vol. 8.

Zeng, Z. et al., "Coherent Closed Quasi-Clique Discovery from Large Dense Graph Databases," Proceedings of the 12$^{th}$ ACM SIGKDD International Conference on Knowledge Discovery and Data Mining, ACM, 2006, 6 pages.

Zhu, X., "Semi-Supervised Learning with Graphs," 2005, 174 pages.

"McAfee SiteAdvisor: What is SiteAdvisor Software?" McAfee®, 2009, [Online] [Retrieved on Jul. 23, 2009] Retrieved from the Internet<URL:http://www.siteadvisor.com/howitworks/index.html>.

"StopBadware.org—StopBadware.org Frequently Asked Questions," stopbadware.org, 2009, [Online] [Retrieved on Jul. 23, 2009] Retrieved from the Internet<URL:htto://www.stopbadware.org/home/faq>.

"TrustedSource™: the Next-Generation Reputation System White Paper," Secure Computing Corporation, Oct. 2006, 6 pages.

Walsh, L., "Careful, Trend Micro Might Give You a Bad Web Reputation," ChannelWeb Network, Mar. 26, 2007, [online] [Retrieved on Jun. 21, 2007] Retrieved from the Internet<URL:http://www.v3.crn.com/security/198500632>.

Walsh, K., "Fighting PeertoPeer SPAM and Decoys with Object Reputation," ACM, Aug. 22-26, 2005, pp. 1-6.

U.S. Appl. No. 12/059,258, filed Mar. 31, 2008, Inventors Sourabh Satish et al.

U.S. Appl. No. 12/059,271, filed Mar. 31, 2008, Inventors Brian Hernacki et al.

U.S. Appl. No. 12/165,599, filed Jun. 30, 2008, Inventor Carey S. Nachenberg.

U.S. Appl. No. 12/242,634, filed Sep. 30, 2008, Inventors Josephine Gibney et al.

U.S. Appl. No. 12/407,772, filed Mar. 19, 2009, Inventors Carey S. Nachenberg et al.

U.S. Appl. No. 12/416,020, filed Mar. 31, 2009, Inventors Shane Pereira et al.

U.S. Appl. No. 13/556,401, filed Jul. 24, 2012, Inventors Carey S. Nachenberg et al.

U.S. Appl. No. 13/677,914, filed Nov. 15, 2012, Inventors Duen Hong Chau et al.

U.S. Appl. No. 13/666,788, filed Nov. 1, 2012, Inventors Carey S. Nachenberg et al.

U.S. Appl. No. 13/558,177, filed Jul. 25, 2012, Inventors Scott Schneider et al.

* cited by examiner

LINEAGE-BASED REPUTATION SYSTEM

BACKGROUND OF THE INVENTION

1. Field of the Invention

This invention pertains in general to computer security and in particular to the identification of malicious software (malware).

2. Description of the Related Art

There is a wide variety of malicious software (malware) that can attack modern computers. Malware threats include computer viruses, worms, Trojan horse programs, spyware, adware, crimeware, and phishing websites. Modern malware is often designed to provide financial gain to the attacker. For example, malware can surreptitiously capture important information such as logins, passwords, bank account identifiers, and credit card numbers. Similarly, malware can provide hidden interfaces that allow the attacker to access and control the compromised computer.

Software applications that are downloaded and installed on a client can either be vulnerable to malware attacks or contain malware. Usually the software applications are downloaded and installed by a user who has some knowledge of the reputation associated with the software application (e.g. knowledge of a reputation of the manufacturer of the software, knowledge of the reliability of the software application). Knowledge of the reputation of the software allows the user to assess the likelihood that the software application is malicious. However, in the case of malware, the software applications can be downloaded or installed on the user's client without the user's knowledge. Thus, even if all the applications on the client are known to the user have good reputations, this does not guarantee that the client is free of malware.

Software applications installed on a client may be automatically detected by security software programs but it can be difficult for even the security software to assess the reputation of all of the software applications installed on a client. Because of the large number of software applications that are constantly being introduced in modern computing environments, reputation information is not known for many software applications. It is particularly difficult to assess the reputation of malware because of "polymorphisms" or engineered variations in the malware which cause the security software to identify it as a different software application.

Accordingly, there is a need in the art for methods of assessing the reputations of software applications installed on clients.

BRIEF SUMMARY

The above and other needs are met by methods, computer-readable storage media, and systems for determining a reputation score for a file based at least in part on the lineage of the file.

One aspect provides a computer-implemented method for determining a reputation score for a file. Embodiments of the method comprise receiving a lineage report specifying a lineage relationship for a file created at a client and generating a lineage score for the file based at least in part on the lineage report. The method further comprises generating a reputation score for the file based at least in part on the lineage score. The reputation score indicates a likelihood that the file is malicious software.

Another aspect provides a non-transitory computer-readable storage medium storing executable computer program instructions for determining a reputation score for a file. The computer-readable storage medium stores computer program instructions for receiving a lineage report specifying a lineage relationship for a file created at a client and generating a lineage score for the file based at least in part on the lineage report. The computer-readable storage medium further comprises computer program instructions for generating a reputation score for the file based at least in part on the lineage score. The reputation score indicates a likelihood that the file is malicious software.

Still another aspect provides a computer system for determining a reputation score for a file. The system comprises a non-transitory computer-readable storage medium storing executable computer program instructions for receiving a lineage report specifying a lineage relationship for a file created at a client and generating a lineage score for the file based at least in part on the lineage report. The computer-readable storage medium further comprises computer program instructions for generating a reputation score for the file based at least in part on the lineage score. The reputation score indicates a likelihood that the file is malicious software. The computer system further comprises a computer processor configured to execute the computer program instructions.

The features and advantages described in this summary and the following detailed description are not all-inclusive. Many additional features and advantages will be apparent to one of ordinary skill in the art in view of the drawings, specification, and claims hereof.

The figures depict an embodiment of the present invention for purposes of illustration only. One skilled in the art will readily recognize from the following description that alternative embodiments of the structures and methods illustrated herein may be employed without departing from the principles of the invention described herein.

DETAILED DESCRIPTION

Figure 1:
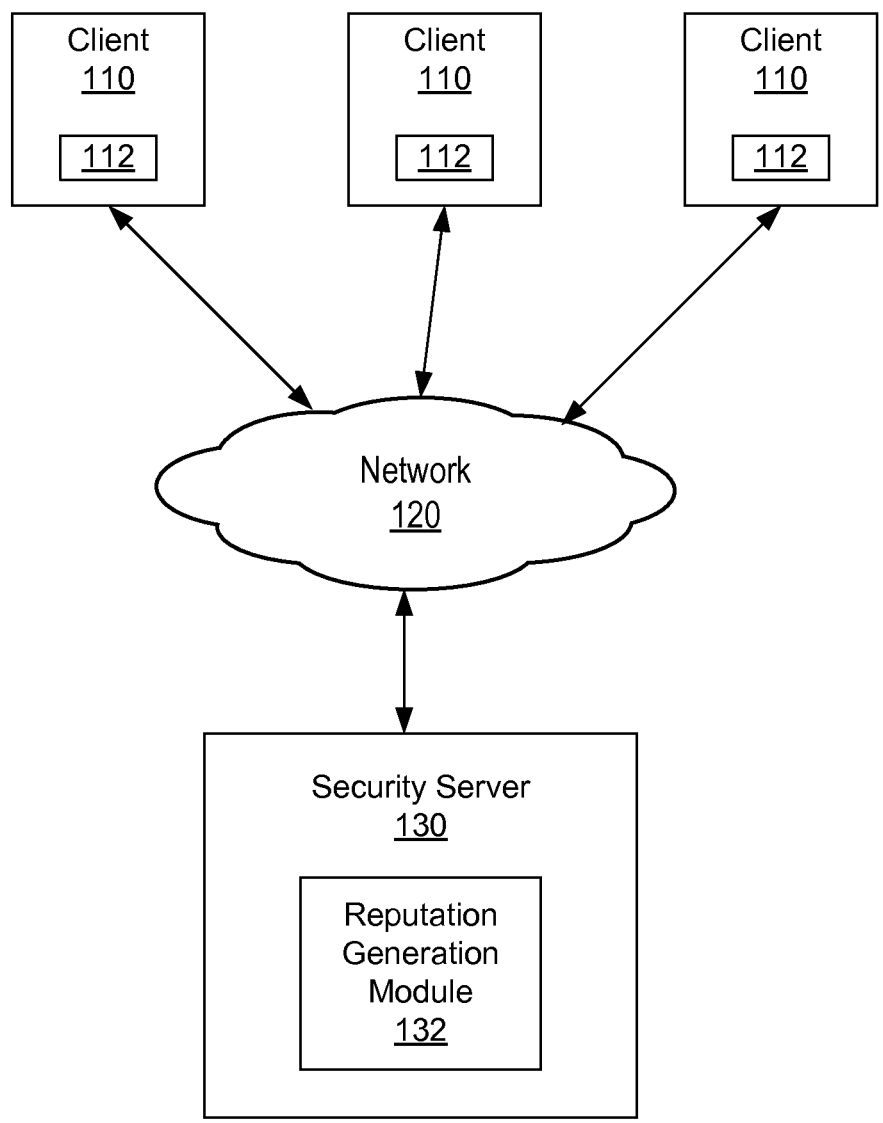
FIG. 1 is a high-level block diagram of a computing environment for using file lineage data to determine reputations of software applications according to one embodiment.

FIG. 1 is a high-level block diagram of a computing environment 100 for using file lineage data to determine reputations of software applications according to one embodiment. FIG. 1 illustrates a security server 130 and three clients 110 connected by a network 120. The illustrated environment 100 represents a typical computing environment where multiple clients 110 interact with the security server 130 to identify and remediate malware at the clients. Only three clients 110 are shown in FIG. 1 in order to simplify and clarify the description. Embodiments of the computing environment 100 can have many clients 110 and security servers 130 connected to the network 120.

The client 110 is used by a user to interact with the security server 130 and/or other entities on the network 120. In one embodiment, the client 110 is a personal computer (PC) such as a desktop or notebook computer. In other embodiments, the client 110 is a mobile telephone, personal digital assistant, or other electronic device. For purposes of this description, the term "client" also includes computers such as servers and gateways that encounter software applications or other entities that might constitute malware or other threats. For example, a client 110 can be a network gateway located between an enterprise network and the Internet.

The client 110 executes a security module 112 that reports lineage data for files at the client to the security server 130. The lineage data associated with a given file identifies the file that created the given file, as well as any files that are created by the given file. Herein, a file that creates another file is referred to as the "parent file" and the file created by the parent file is referred to as the "child file." The relationship between parent and child files is also described by the "file distance," which indicates the number of generations between parent and child files. For example, assume file A creates file B which, in turn, creates file C. File A is the parent of files B and C and file B is the parent of file C. The distance between files A and B is "1," and the distance between files A and C is "2." Two child files that share the same parent file are referred to as "sibling files." For purposes of this description, the term "file" also encompasses a process launched when an associated file is executed. Thus, if a process is launched when a file is executed, and the process then creates a new file, the file that was executed is said to be the parent of the created file. Similarly, the executed file is sometimes referred to as an "application."

The security server 130 interacts with the clients 110 via the network 120. A reputation generation module 132 at the security server 130 receives the lineage data reports from the clients 110 and uses the lineage data to produce reputation scores for files present on the clients 110. For example, the security server 130 can generate a score indicating a bad reputation for a file having lineage data indicating that the file created known malware on multiple clients 110. Similarly, the security server can generate a score indicating a good reputation for a file having lineage data indicating that the file created legitimate (non-malicious) files on many clients. The reputation generation module 132 can generate the reputation scores based on the lineage data alone or based on a combination of different types of data. The security server 130 reports the reputation scores to the clients 110.

The security modules 112 of the clients 110 use the reputation scores received from the security server 130 to identify and remediate malware at the clients. A security module 112 can use the reputation score of a file as a signal of the potential maliciousness of the file, and use this signal alone or in combination with other signals to evaluate whether a particular file is malicious. Using lineage data to contribute to the reputation scores for files thus results in more accurate malware detection and fewer false positive detections.

The network 120 enables communications among the clients 110 and the security server 130 and can comprise the Internet. In one embodiment, the network 120 uses standard communications technologies and/or protocols. Thus, the network 120 can include links using technologies such as Ethernet, 802.11, worldwide interoperability for microwave access (WiMAX), 3G, digital subscriber line (DSL), asynchronous transfer mode (ATM), InfiniBand, PCI Express Advanced Switching, etc. Similarly, the networking protocols used on the network 120 can include multiprotocol label switching (MPLS), the transmission control protocol/Internet protocol (TCP/IP), the User Datagram Protocol (UDP), the hypertext transport protocol (HTTP), the simple mail transfer protocol (SMTP), the file transfer protocol (FTP), etc. The data exchanged over the network 120 can be represented using technologies and/or formats including the hypertext markup language (HTML), the extensible markup language (XML), etc. In addition, all or some of links can be encrypted using conventional encryption technologies such as secure sockets layer (SSL), transport layer security (TLS), virtual private networks (VPNs), Internet Protocol security (IPsec), etc. In another embodiment, the entities can use custom and/or dedicated data communications technologies instead of, or in addition to, the ones described above.

Figure 2:
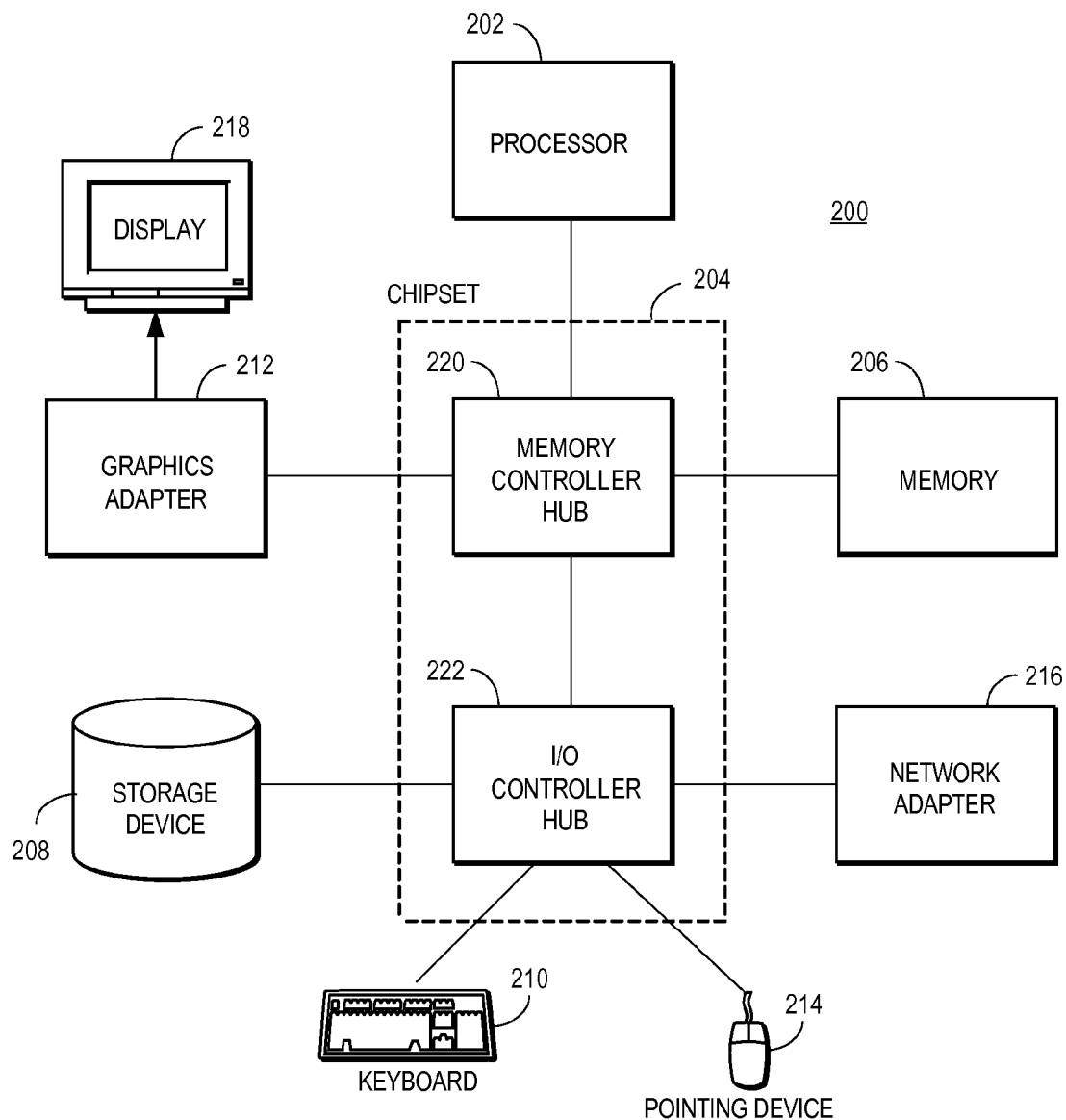
FIG. 2 is a high-level block diagram illustrating a typical computer for use as a security server or a client.

FIG. 2 is a high-level block diagram of a computer 200 for acting as a client 110 and/or as a security server 130. Illustrated are at least one processor 202 coupled to a chipset 204. Also coupled to the chipset 204 are a memory 206, a storage device 208, a keyboard 210, a graphics adapter 212, a pointing device 214, and a network adapter 216. A display 218 is coupled to the graphics adapter 212. In one embodiment, the functionality of the chipset 204 is provided by a memory controller hub 220 and an I/O controller hub 222. In another embodiment, the memory 206 is coupled directly to the processor 202 instead of the chipset 204.

The storage device 208 is any non-transitory computer-readable storage medium, such as a hard drive, compact disk read-only memory (CD-ROM), DVD, or a solid-state memory device. The memory 206 holds instructions and data used by the processor 202. The pointing device 214 may be a mouse, track ball, or other type of pointing device, and is used in combination with the keyboard 210 to input data into the computer system 200. The graphics adapter 212 displays images and other information on the display 218. The network adapter 216 couples the computer system 200 to the network 120.

As is known in the art, a computer 200 can have different and/or other components than those shown in FIG. 2. In addition, the computer 200 can lack certain illustrated components. In one embodiment, a computer 200 acting as a reputation server 140 can lack a keyboard 210, pointing device 214, graphics adapter 212, and/or display 218. Moreover, the storage device 208 can be local and/or remote from the computer 200 (such as embodied within a storage area network (SAN)).

As is known in the art, the computer 200 is adapted to execute computer program modules for providing functionality described herein. As used herein, the term "module" refers to computer program logic utilized to provide the specified functionality. Thus, a module can be implemented in hardware, firmware, and/or software. In one embodiment, program modules are stored on the storage device 208, loaded into the memory 206, and executed by the processor 202.

Embodiments of the entities described herein can include other and/or different modules than the ones described here. In addition, the functionality attributed to the modules can be performed by other or different modules in other embodiments. Moreover, this description occasionally omits the term "module" for purposes of clarity and convenience.

Figure 3:
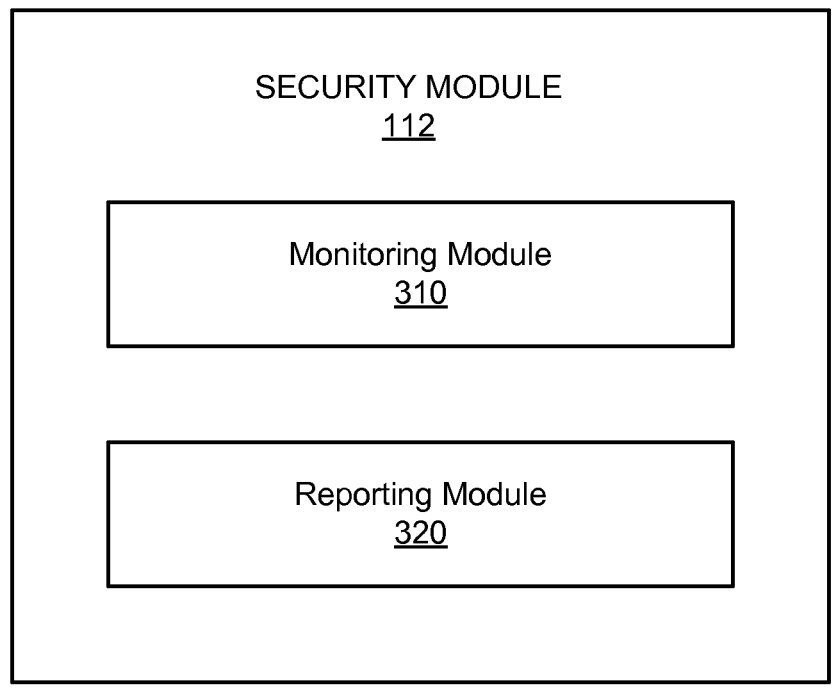
FIG. 3 is a high-level block diagram illustrating a detailed view of a security module of a client according to one embodiment.

FIG. 3 is a high-level block diagram illustrating a detailed view of a security module 112 of a client 110 according to one embodiment. In some embodiments, the security module 112 is incorporated into an operating system executing on the client 110 while in other embodiments the security module 112 is a standalone application or part of another product. As shown in FIG. 3, the security module 112 includes a monitoring module 310 and a reporting module 320. Those of skill in the art will recognize that other embodiments of the security module 112 can have different and/or other modules than the ones described here, and that the functionalities can be distributed among the modules in a different manner.

The monitoring module 310 monitors file activity at the client 110 and generates lineage data based on the activity. In one embodiment, the monitoring module 310 detects each file creation event that occurs at the client. 110. For example, the monitoring module 310 can use a file system filter driver that intercepts certain file activities, such as file writes, in order to detect when a new file is being created. Depending upon the embodiment, the monitoring module 310 may also detect other types of events, such as modifications of existing files.

When the monitoring module 310 detects a new file being created, the monitoring module collects lineage data for the new file. As mentioned above, the lineage data includes the identity of the parent file and the identity of the new child file. The monitoring module 310 generates identifiers of these files using, e.g., a hashing algorithm such as a variant of the Secure Hash Algorithm (SHA). Depending upon the embodiment, the monitoring module 310 may include different and/or additional information in the lineage data, such as data describing client state at the time the child file was created. Additionally, the monitoring module 310 can generate lineage data at times other than new file creation. For example, if the file system of the client 110 maintains information from which lineage data can be inferred, the monitoring module 310 can scan the storage device 208 to collect the lineage data.

The monitoring module 310 provides the lineage data to a reporting module 320. The reporting module 320 composes reports describing the lineage data and sends the reports to the security server 130. In one embodiment, a lineage data report includes the identifiers of the two files involved in the lineage relationship, and an indication of the relationships of the individual files. For example, a lineage data report can be formatted as a (identifier of parent file, identifier of child file) tuple. The lineage data report can also describe lineage relationships for more than two files, such as a list of all child files that a given parent file was observed to create at the client 110. In one embodiment, the reporting module 320 sends the reports to the security server 130 upon receiving the lineage data from the monitoring module 310. In other embodiments, the reporting module 320 stores the lineage data locally for a period of time and then sends reports for the accumulated lineage data in batch at specified times, such as once a day. In still another embodiment, the monitoring module 310 and/or reporting module 320 compute one or more of the lineage scores described below and transmits the scores to the security server 130.

Figure 4:
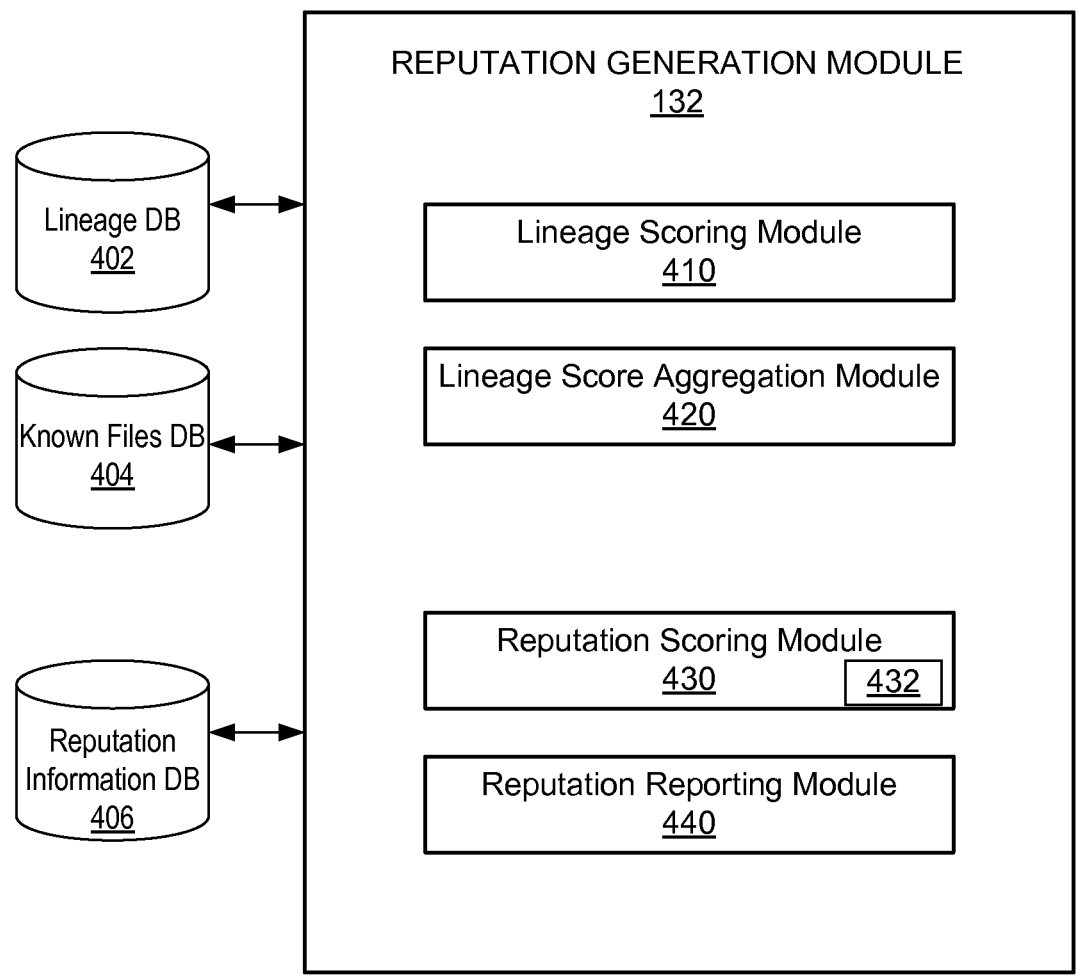
FIG. 4 is a high-level block diagram illustrating a detailed view of a reputation generation module of a security server according to one embodiment.

FIG. 4 is a high-level block diagram illustrating a detailed view of a reputation generation module 132 of the security server 130 according to one embodiment. The reputation generation module 132 receives lineage data reports from the multiple clients 110 connected to the security server 130 via the network 120. As shown in FIG. 4, the reputation generation module 132 includes a lineage scoring module 410, a lineage score aggregation module 420, a reputation scoring module 430 and a reputation reporting module 440. Additionally, the multiple modules of the reputation generation module 132 store and/or retrieve data from a lineage information database 402, a known files database 404 and a reputation information database 406. Those of skill in the art will recognize that other embodiments of the reputation generation module 132 can have different and/or other modules than the ones described here, and that the functionalities can be distributed among the modules in a different manner.

The lineage information database 402 stores the lineage information described by the lineage reports received from the clients 110. As described above, the lineage information can identify a parent file and a child file created by the parent. In addition, the lineage information can describe extended lineages as measured by file distance. Collectively, across all of the clients 110 that provide reports, the lineage data describes the lineages of a large number of files. Optionally, the lineage information database 402 is absent. In some embodiments, lineage information is stored locally on the clients 110 and reported by the clients in submissions that are not necessarily saved by the reputation generation module 132. Thus, there is no need for the lineage information database 402.

The known files database 404 describes sets of files known to have particular characteristics. In one embodiment, the known files database 404 describes a set of files that are known to be malicious. In addition, the known files database 404 describes a set of known legitimate files that have been exploited in the past to introduce new malware onto a client 110. For example, certain files associated with the MICROSOFT WINDOWS operating system are known to be exploited by malware to introduce new malware to clients 110. These files include, e.g., "SVCHOST.EXE" and "WINLOGON.EXE." The known files database also describes a set of known legitimate files that are typically used to introduce legitimate software onto the clients 110 (e.g., "MSIEXEC.EXE" found in the WINDOWS operating system). In one embodiment, the known files database 404 identifies the files using the same identification technique used in the file lineage reports to identify files (e.g., a SHA-2 hash). One or more security specialists associated with the entity that operates the security server 130 establish the file sets in the known files database 404 in one embodiment.

The reputation information database 406 stores reputation information for use in calculating reputations for files, clients 110, and/or other entities. The reputation information can include information provided by the clients 110, by the entity that operates the security server 130, and/or by other sources. The reputation information can describe characteristics of files and include, for example, information indicating a number of clients 110 on which a file is detected, frequencies at which a file is installed and uninstalled on clients 110, information regarding any known degradations to system performance associated with a file, the dates on which file were identified on the clients 110, and the parties associated with the manufacture or development of the files. The reputation information can also describe characteristics of clients 110 and/or other entities, such as hygiene scores indicating likelihoods that clients 110 are exposed to malware and descriptions of security settings associated with clients. Other embodiments of the reputation information database 406 store different and/or additional reputation information. Moreover, the lineage information itself is considered reputation information and data derived from the lineage reports can be stored in the reputation information database 406.

Turning now to the modules within the reputation generation module 132, the lineage scoring module 410 generates lineage scores for files created on clients 110. The lineage scores are based on the lineage information and the known files described by the known files database 404. The lineage information can be stored in the lineage information database 402 and/or in local storage of a client 110. A lineage score of a file is a feature of the file that can be used to discriminate between legitimate and malicious software. In one embodiment, the lineage scoring module 410 uses multiple lineage metrics which exploit the lineage information to generate multiple lineage scores for a single file. The metrics employed by one embodiment of the lineage scoring module 410 are described herein. Different embodiments can use different and/or additional metrics.

One metric used by the lineage scoring module 410 to generate a lineage score for a file determines whether the file was created by known malware. The lineage scoring module 410 uses the lineage information in the lineage database 402 and the set of known malicious files described by the known files database 404 to determine if a given child file has a parent file that is known to be malware. In one embodiment, this "created by known malware" metric is measured as a count indicating the number of times that the file was created by known malware. For example, if the lineage information indicates that the file FOO.EXE was created by known malicious files MALWARE1.EXE and MALWARE2.EXE, the lineage scoring module 410 generates a lineage score of 2 for file FOO.EXE.

The "created by known malware" metric can also extend down multiple generations of files (i.e., account for files having a file distance greater than one). For example, if the lineage information shows that MALWARE1.EXE (known malware) created FOO.EXE, and further that FOO.EXE created BAR.EXE, then an embodiment of the lineage scoring module 410 increases BAR.EXE's "created by known malware" metric to account for its grandparent file MALWARE1.EXE. In one embodiment, the metric is adjusted by a constant amount if an ancestor of a file is known malware. In other embodiments, the metric is adjusted by an amount that is a function of the distance of the file to the known malware. For example, the metric can be adjusted by an exponentially-decaying amount based on the file distance between the file being scored and its known malicious ancestor, thus decreasing the influence of the ancestor as the file distance increases.

Another lineage metric determines whether a file creates known malware. The lineage scoring module 410 uses the lineage information and the set of known malicious files described by the known files database 404 to determine if a given parent file created a child file that is known to be malware. This behavior might occur, for example, if the parent file is an unknown malware dropper or a legitimate application that has been used to download malware. In one embodiment, this "created known malware" metric is measured as a count indicating the number of times that the file created malware. For example, if the lineage information stored in the lineage information database 402 indicates that the file FOO.EXE created the file MALWARE3.EXE, the lineage scoring module 410 increases the count of FOO.EXE's "created known malware" score by one. Similarly, the lineage scoring module 410 can increase the "created known malware" lineage score for a file that creates non-malware files having low reputations as determined by information in the reputation information database 406.

A third lineage metric determines whether a file was created by a legitimate application that is known to be used as a malware introduction vector. The lineage scoring module 410 uses the lineage information to determine whether a parent file identified therein is within the set of known legitimate files that have been exploited in the past to introduce malware described by the known files database 404. In one embodiment, this "created by known introduction vector" metric for a child file is measured as a count indicating the number of times that the child file was created by a parent file known to be a malware introduction vector. For example, if the lineage information stored in the lineage information database 402 indicates that the file FOO.EXE was created by the parent file PARENT.EXE, which is known to be exploited by malware to serve as an introduction vector, the lineage scoring module 410 increases the "created by known introduction vector" lineage score for the file FOO.EXE.

A fourth lineage metric determines whether a file was created by a known legitimate application that regularly installs other known legitimate applications. The lineage scoring module 410 uses the lineage information to determine whether a parent file identified therein is within the set of known legitimate files that are typically used to introduce legitimate software onto clients described by the known files database 404. In one embodiment, this "created by known legitimate installer" metric for a child file is measured as a count indicating the number of times that the child file was created by a parent file known to be used to install legitimate applications. Examples of parent files that are known to regularly install other legitimate programs include WINDOWSUPDATE.EXE and MSIEXEC.EXE.

A fifth lineage metric determines whether a parent file creates a child file that is known to be legitimate. The lineage scoring module 410 uses the lineage information to determine whether a child file identified therein is within the sets of known legitimate files described by the known files database 404. In one embodiment, this "created known legitimate file" metric file for the parent file is measured as a count indicating the number of legitimate child files it creates.

A sixth lineage metric determines whether a file is a sibling of known malware. For example, if a parent file creates file A.EXE which is unknown, and creates file B.EXE, which is known to be malware, then file A.EXE is judged to be a sibling of known malware. This behavior might occur, for example, if the parent file is an unknown malware dropper that has introduced one or more known malware files and one or more unknown malware files onto a computer system. In one embodiment, this "sibling of known malware" metric is measured as a count indicating the number of times that the file was a sibling of known malware. Similarly, the lineage scoring module 410 can increase the "sibling of known malware" metric for a file that is a sibling of non-malware files having low reputations as determined by information in the reputation information database 406.

A seventh lineage metric determines whether a file is a sibling of a known legitimate file. For example, if a parent file has creates file A.EXE which is unknown, and creates file B.EXE, which is known to be legitimate, then file A.EXE is judged to be a sibling of a known legitimate file. The lineage scoring module 410 uses the lineage information and the set of known legitimate files described by the known files database 404 to determine if a given child file is a sibling of another child file that is known to be legitimate. In one embodiment, this "sibling of known legitimate file" metric is measured as a count indicating the number of times that the file was a sibling of a known legitimate file.

The lineage score aggregation module 420 aggregates the lineage scores produced by the lineage scoring module 410 across the lineage data reports from the multiple clients 110. In one embodiment, each lineage metric described above is treated is a separate score and generated on a per-client basis. For example, the "created by known malware" metric can measure the number of times that a particular child file was created by known malware on a particular client. The lineage score aggregation module 420 aggregates the "created by known malware" metric across all (or a specified subset) of the clients 110. The lineage score aggregation module 420 can use various techniques algorithms to aggregate the lineage scores, and can use different techniques for individual lineage metrics.

In one embodiment, the lineage score aggregation module 420 sums the client-specific lineage scores for a file. For example, if the file FOO.EXE was created by known malware one time on each of five clients, the lineage score aggregation module 420 would produce an aggregated score of five for the "created by known malware" metric for that file. In another embodiment, the lineage score aggregation module 420 averages the client-specific lineage scores for a file. Thus, if the file FOO.EXE was created by known malware twice on one client and once on another client, the aggregated "created by known malware" metric is 1.5. Another aggregation technique used by an embodiment of the lineage score aggregation module 420 is using the maximum lineage score from across all of the clients as the score for the file. Yet another embodiment can combine more than one lineage metric into a new lineage metric. For example, the aggregation module 420 can compute a proportion indicating the percentage of time that the file is created by malware by calculating the number of times that a file was created by known malware divided by the total number of times the file was created. Other embodiments of the aggregation module 420 use different and/or additional techniques to aggregate the scores. As a result of the aggregation, the lineage score aggregation module 420 generates a set of aggregated lineage scores for the file described in the lineage database 402.

The reputation scoring module 430 generates a reputation score for a file detected at a client 110 based on the aggregated lineage scores associated with the file and other reputation information stored in the reputation information database 406. In one embodiment, the reputation scoring module 430 generates a series of continuous scores ranging from a score indicating a very good reputation to a score indicating a very bad reputation for each file. In another embodiment, the reputation scoring module 430 generates a binary score indicating that a file either has a good reputation or a bad reputation.

The reputation scoring module 430 can regenerate file reputation scores based on new reputation information added to the reputation information database 422 and/or new lineage reports submitted by the clients 110. The reputation scores can be generated in real-time, as new lineage reports and/or other reputation information is received, or on a periodic basis. The reputation scoring module 430 stores the file reputation scores in association with unique identifiers for the files in the reputation information database 406 or other storage media.

In one embodiment, the reputation scoring module 430 generates a reputation score for a file by using machine learning. The reputation scoring module 430 uses the aggregated lineage scores, reputation information, and information about known legitimate and known malicious files to learn to recognize malicious and/or legitimate files based on these combined characteristics. Once trained, the reputation scoring module 430 uses the learned information to generate reputation scores for unknown files (i.e., files not known to be malicious or legitimate) that indicate the likelihood that the unknown files are malicious and/or legitimate.

The reputation scoring module 430 can use classifier-based techniques to generate the reputation scores. In this embodiment, the reputation scoring module 430 trains a classifier 432 using one or more training sets of reputation information and the aggregated lineage scores associated with the file. The reputation scoring module 430 may use any type of machine learning algorithm to train the classifier 432 such as Bayesian algorithms, Support Vector Machine algorithms or regression-based algorithms. The classifier 432 learns a set of weights which specify the relative importance of the various types of reputation information (features) in determining the reputation score for a file. In one embodiment the classifier 432 is a decision tree.

For example, assume the reputation scoring module 430 is scoring a file which is not known to be malware, has a low prevalence across the clients 110 (a possible sign of malware), and has lineage information indicating that the file created malware files on at least five different clients. The classifier 432 can consider these data, perhaps along with additional reputation information, and generate a score indicating that the file has a poor reputation and is likely malicious.

The reputation reporting module 440 reports the reputation scores to the security modules 112 of the clients 110 via the network 120. In one embodiment, the reputation reporting module 440 reports the reputation scores in response to specific requests from the security modules 112. The security modules 112 send requests to the security server 130 requesting reputation scores for particular files (identified by their unique identifiers), and the reputation reporting module 440 replies with the scores for those files. In other embodiments, the reputation reporting module 440 reports the reputation scores to the security modules 112 at other times, such as in batches on a period basis.

Figure 5:
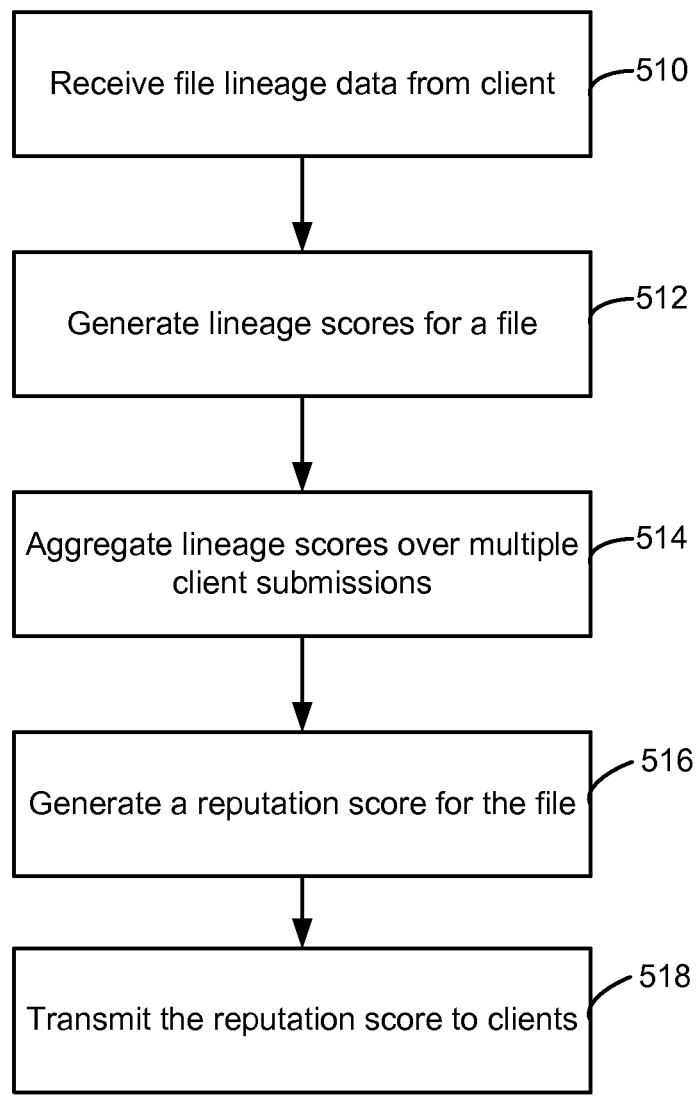
FIG. 5 is a flowchart illustrating steps performed by the reputation generation module according to one embodiment.

FIG. 5 is a flowchart illustrating steps performed by the reputation generation module 132 to generate and report reputation scores according to one embodiment. Other embodiments perform the illustrated steps in different orders, and/or perform different or additional steps. Moreover, some of the steps can be performed by engines or modules other than the reputation generation module 132.

Initially, the reputation generation module 132 receives 510 file lineage reports from a client 110. The lineage reports identify parent files that created child files at the client 110. The reputation generation module 132 generates 512 a set of lineage scores for the file. In one embodiment, the reputation generation module 132 computes scores for multiple individual lineage metrics for files based on the reports. The reputation generation module 132 aggregates 514 the lineage scores for a file across the multiple clients 110 that submitted file lineage reports. The techniques used to aggregate the lineage scores can vary and may include summation, averaging, computing a portion, and taking the maximum lineage score for each metric.

The reputation generation module 132 generates 516 a reputation score for a file based on its aggregated lineage scores and other reputation information associated with the file. In one embodiment, the reputation generation module 132 uses machine learning techniques to generate the reputation score, such as a decision tree classifier. The reputation reporting module 440 transmits the reputation score to the security modules 112 of the clients 110. The clients 110, in turn, use the reputation score to identify malware at the client.

The above description is included to illustrate the operation of the preferred embodiments and is not meant to limit the scope of the invention. The scope of the invention is to be limited only by the following claims. From the above discussion, many variations will be apparent to one skilled in the relevant art that would yet be encompassed by the spirit and scope of the invention.

The invention claimed is:

1. A computer-implemented method of determining a reputation score for a file, the method comprising:
 using a computer to performs steps comprising:
  receiving a plurality of lineage reports from a plurality of clients, a lineage report specifying a lineage relationship for a file created at a client, the lineage report identifying a parent file and a child file created by the parent file at the client;
  generating a plurality of lineage scores for the file using a plurality of lineage metrics based on the plurality of lineage reports;

aggregating the plurality of lineage scores for the file to produce an aggregated lineage score for the file, the aggregating comprising computing a proportion indicating how often the file is created by malware; and generating a reputation score for the file based at least in part on the aggregated lineage score, the reputation score indicating a likelihood that the file is malware.

2. The method of claim 1, wherein generating the plurality of lineage scores comprises generating one or more lineage metrics from a set of metrics consisting of:

a "created by known malware" metric indicating whether the file was created by known malware at the client;

a "created known malware" metric indicating whether the file created malware at the client;

a "created by known introduction vector" metric indicating whether the file was created at the client by a parent file known to be a malware introduction vector;

a "created by known legitimate installer" metric indicating whether the file was created at the client by a parent file known to be used to install legitimate applications;

a "created known legitimate file" metric indicating whether the file created a known legitimate file at the client;

a "sibling of known malware" metric indicating whether the file was created by a same parent that also created a known malware file; and a "sibling of known legitimate file" metric indicating whether the file was created by a same parent that also created a known legitimate file.

3. The method of claim 2, wherein:

the "created by known malware" metric indicates a count of a number of times the file was created by known malware at the client;

the "created known malware" metric indicates a count of a number of times the file created malware at the client;

the "created by known introduction vector" metric indicates a count of a number of times the file was created at the client by a parent file known to be a malware introduction vector;

the "created by known legitimate installer" metric indicates a count of a number of times the file was created at the client by a parent file known to be used to install legitimate applications;

the "created known legitimate file" metric indicates a count of a number of times the file created a known legitimate file at the client; and the "sibling of known malware" metric indicates a count of a number of times the file was a sibling of known malware; and the "sibling of known legitimate file" metric indicates a count of a number of times the file was a sibling of a known legitimate file.

4. The method of claim 1, wherein computing the proportion indicating how often the file is created by malware comprises:

computing a percentage of time that the file is created by malware by calculating a number of times that a file was created by known malware divided by a total number of times the file was created.

5. The method of claim 1, wherein generating the reputation score for the file based at least in part on the aggregated lineage score comprises:

identifying other reputation information associated with the file, the other reputation information describing characteristics of the client; and using a machine learning technique to generate the reputation score for the file based on the aggregated lineage score and the other reputation information.

6. The method of claim 5, wherein using a machine learning technique comprises:

training a classifier using lineage information associated with known malicious files to generate the reputation score.

7. The method of claim 1, further comprising:

reporting the reputation score associated with the file to the client, wherein the client is adapted to use the reputation score to identify malware at the client.

8. A non-transitory computer-readable storage medium storing executable computer program instructions for determining a reputation score for a file, comprising computer program instructions for:

receiving a plurality of lineage reports from a plurality of clients, a lineage report specifying a lineage relationship for a file created at a client, the lineage report identifying a parent file and a child file created by the parent file at the client;

generating a plurality of lineage scores for the file using a plurality of lineage metrics based on the plurality of lineage reports;

aggregating the plurality of lineage scores for the file to produce an aggregated lineage score for the file, the aggregating comprising computing a proportion indicating how often the file is created by malware; and generating a reputation score for the file based at least in part on the aggregated lineage score, the reputation score indicating a likelihood that the file is malware.

9. The computer-readable storage medium of claim 8, wherein the computer program instructions for generating the plurality of lineage scores comprise computer program instructions for generating one or more lineage metrics from a set of metrics consisting of:

a "created by known malware" metric indicating whether the file was created by known malware at the client;

a "created known malware" metric indicating whether the file created malware at the client;

a "created by known introduction vector" metric indicating whether the file was created at the client by a parent file known to be a malware introduction vector;

a "created by known legitimate installer" metric indicating whether the file was created at the client by a parent file known to be used to install legitimate applications; and a "created known legitimate file" metric indicating whether the file created a known legitimate file at the client;

a "sibling of known malware" metric indicating whether the file was created by a same parent that also created a known malware file; and a "sibling of known legitimate file" metric indicating whether the file was created by a same parent that also created a known legitimate file.

10. The computer-readable storage medium of claim 9, wherein:

the "created by known malware" metric indicates a count of a number of times the file was created by known malware at the client;

the "created known malware" metric indicates a count of a number of times the file created malware at the client;

the "created by known introduction vector" metric indicates a count of a number of times the file was created at the client by a parent file known to be a malware introduction vector;

the "created by known legitimate installer" metric indicates a count of a number of times the file was created at the client by a parent file known to be used to install legitimate applications; and the "created known legitimate file" metric indicates a count of a number of times the file created a known legitimate file at the client;

the "sibling of known malware" metric indicates a count of a number of times the file was a sibling of known malware; and the "sibling of known legitimate file" metric indicates a count of a number of times the file was a sibling of a known legitimate file.

11. The computer-readable storage medium of claim 8, wherein the computer program instructions for generating the reputation score for the file based at least in part on the aggregated lineage score comprise computer program instructions for:

identifying other reputation information associated with the file, the other reputation information describing characteristics of the client; and using a machine learning technique to generate the reputation score for the file based on the aggregated lineage score and the other reputation information.

12. The computer-readable storage medium of claim 8, further comprising computer program instructions for:

reporting the reputation score associated with the file to the client, wherein the client is adapted to use the reputation score to identify malware at the client.

13. A computer system for determining a reputation score for a file, the system comprising:

a non-transitory computer-readable storage medium storing executable computer program instructions comprising instructions for:

receiving a plurality of lineage reports from a plurality of clients, a lineage report specifying a lineage relationship for a file created at a client, the lineage report identifying a parent file and a child file created by the parent file at the client;

generating a plurality of lineage scores for the file using a plurality of lineage metrics based on the plurality of lineage reports;

aggregating the plurality of lineage scores for the file to produce an aggregated lineage score for the file, the aggregating comprising computing a proportion indicating how often the file is created by malware; and generating a reputation score for the file based at least in part on the aggregated lineage score, the reputation score indicating a likelihood that the file is malware; and a computer processor configured to execute the computer program instructions.

14. The system of claim 13, wherein the computer program instructions for generating the plurality of lineage scores comprises computer program instructions for generating one or more lineage metrics from a set of metrics consisting of:

a "created by known malware" metric indicating whether the file was created by known malware at the client;

a "created known malware" metric indicating whether the file created malware at the client;

a "created by known introduction vector" metric indicating whether the file was created at the client by a parent file known to be a malware introduction vector;

a "created by known legitimate installer" metric indicating whether the file was created at the client by a parent file known to be used to install legitimate applications; and a "created known legitimate file" metric indicating whether the file created a known legitimate file at the client;

a "sibling of known malware" metric indicating whether the file was created by a same parent that also created a known malware file; and a "sibling of known legitimate file" metric indicating whether the file was created by a same parent that also created a known legitimate file.

15. The system of claim 13, wherein the computer program instructions for generating the reputation score for the file based at least in part on the aggregated lineage score comprises computer program instructions for:

identifying other reputation information associated with the file, the other reputation information describing characteristics of the client; and using a machine learning technique to generate the reputation score for the file based on the aggregated lineage score and the other reputation information.

16. The computer-readable storage medium of claim 8, wherein the computer program instructions for computing the proportion indicating how often the file is created by malware comprise computer program instructions for:

computing a percentage of time that the file is created by malware by calculating a number of times that a file was created by known malware divided by a total number of times the file was created.

17. The system of claim 13, wherein the computer program instructions for computing the proportion indicating how often the file is created by malware comprise computer program instructions for:

computing a percentage of time that the file is created by malware by calculating a number of times that a file was created by known malware divided by a total number of times the file was created.

18. The method of claim 1, wherein a lineage metric on which a lineage score for the file is based comprises a file distance metric describing file creation behavior for multiple generations of files.

19. The method of claim 1, wherein a lineage metric on which a lineage score for the file is based is adjusted by an amount that is a function of a distance of the file to known malware.

* * * * *

UNITED STATES PATENT AND TRADEMARK OFFICE
CERTIFICATE OF CORRECTION

PATENT NO.         : 8,510,836 B1
APPLICATION NO.    : 12/831004
DATED              : August 13, 2013
INVENTOR(S)        : Carey S. Nachenberg Page 1 of 1

It is certified that error appears in the above-identified patent and that said Letters Patent is hereby corrected as shown below:

In the References Cited under item (56), (Other Publications) on title page 3, Column 1, line 19, at the URL for StopBadware.org; delete "htto" and insert --http--.

In the Claims:

Column 10, Claim 1, line 59; delete "computer to performs steps" and insert --computer to perform steps--.

Signed and Sealed this
Seventeenth Day of June, 2014

Michelle K. Lee
*Deputy Director of the United States Patent and Trademark Office*